US012128580B2

(12) United States Patent
Jann et al.

(10) Patent No.: US 12,128,580 B2
(45) Date of Patent: Oct. 29, 2024

(54) RETRACTABLE PROTECTIVE PANES (71) Applicant: ZÜND SYSTEMTECHNIK AG, Altstätten (CH)

(72) Inventors: Simon Jann, Altstätten (CH); Martin Holzinger, Altstätten (CH)

(73) Assignee: ZÜND SYSTEMTECHNIK AG, Altstätten (CH)

(*) Notice: Subject to any disclaimer, the term of this patent is extended or adjusted under 35 U.S.C. 154(b) by 76 days.

(21) Appl. No.: 17/681,583

(22) Filed: Feb. 25, 2022

(65) Prior Publication Data
US 2022/0274279 A1 Sep. 1, 2022

(30) Foreign Application Priority Data
Mar. 1, 2021 (EP) ..................................... 21160088

(51) Int. Cl.
B26D 7/24 (2006.01)
B26D 5/00 (2006.01)
F16P 3/14 (2006.01)

(52) U.S. Cl.
CPC ................ B26D 7/24 (2013.01); B26D 5/007 (2013.01); F16P 3/144 (2013.01)

(58) Field of Classification Search
CPC ..... F16P 3/12; F16P 3/14; F16P 3/144; B26D 7/22; B26D 7/24; B26D 5/007
See application file for complete search history.

(56) References Cited

U.S. PATENT DOCUMENTS

| 3,842,260 | A | * | 10/1974 | Christensen | ......... A22C 7/0061 250/221 |
| 4,385,508 | A | * | 5/1983 | Schimko | ................. F16P 3/144 66/157 |
| 5,280,622 | A | * | 1/1994 | Tino | ......................... B25J 19/06 700/255 |

(Continued)

FOREIGN PATENT DOCUMENTS

| DE | 3441221 A1 | 7/1985 | |
| EP | 1724075 A2 | * 11/2006 | ............. B23D 47/04 |

(Continued)

OTHER PUBLICATIONS

Entry for 'Control unit' on wikipedia; obtained from https://en.wikipedia.org/wiki/Control_unit on Aug. 28, 2023.*

Primary Examiner — Evan H MacFarlane
(74) Attorney, Agent, or Firm — Muncy, Geissler, Olds & Lowe, P.C.

(57) ABSTRACT

A cutting machine includes a table having a planar working surface lying in a working surface plane, a protective pane, a light curtain device configured to generate a light curtain, a crossbeam above the working surface and designed for linear positionability parallel to a first horizontal axis, and a module on the crossbeam and designed for linear positionability parallel to a second horizontal axis perpendicular to the first horizontal axis. The cutting machine further includes a control unit configured to control the cutting machine. The cutting machine has a first operating state and a second operating state. In the first operating state, the protective pane on a first side of the table is below the working surface plane. In the second operating state, both the protective pane and the light curtain on the first side of the table are at least partially above the working surface plane.

11 Claims, 4 Drawing Sheets

(56) References Cited

U.S. PATENT DOCUMENTS

| | | | | |
|---|---|---|---|---|
| 5,323,513 | A | * | 6/1994 | Binder ............... F16P 1/02 241/37.5 |
| 6,765,192 | B2 | * | 7/2004 | Maurin ............... B26D 7/24 250/221 |
| 6,856,862 | B1 | * | 2/2005 | Feltner ............... H01L 21/67288 250/221 |
| 2001/0001281 | A1 | * | 5/2001 | Weder ............... F16P 3/144 425/135 |
| 2003/0029992 | A1 | * | 2/2003 | Kudo ............... G01V 8/20 250/221 |
| 2005/0247102 | A1 | * | 11/2005 | Schneiderheinze .... B21D 55/00 72/444 |
| 2008/0066596 | A1 | * | 3/2008 | Yamaguchi ............... F16P 3/141 83/548 |
| 2010/0043980 | A1 | * | 2/2010 | Sleijpen ............... B26D 7/086 156/378 |
| 2016/0231729 | A1 | | 8/2016 | Deambrosis |
| 2017/0038494 | A1 | * | 2/2017 | Gelineau ............... F16P 3/144 |
| 2020/0009756 | A1 | * | 1/2020 | Van Cauwenberghe ............... B26D 1/11 |
| 2020/0324332 | A1 | * | 10/2020 | Fiessler ............... B30B 15/285 |

FOREIGN PATENT DOCUMENTS

| | | | |
|---|---|---|---|
| EP | 1385674 | B1 | 6/2008 |
| EP | 2488333 | B1 | 3/2014 |
| WO | 0148417 | A1 | 7/2001 |
| WO | WO-2021165720 | A1 * | 8/2021 ......... B23K 26/0876 |

\* cited by examiner

RETRACTABLE PROTECTIVE PANES

CROSS-REFERENCE

The present application claims priority to European Patent application 21160088.7 filed Mar. 1, 2021 which is herein incorporated by reference in its entirety.

FIELD OF THE INVENTION

The present invention relates to a cutting machine for cutting, milling, creasing, perforating or marking printed sheets of paper, cardboard or similar materials of plastic films, of cloths or the like. Furthermore, composite sheets printed or not printed of wood, paper, cardboard, aluminum, plastics or foams or the like can be processed with the cutting machine.

BACKGROUND OF THE INVENTION

Generic machines are described, for example, in documents EP 1 385 674 B1 and EP 2 488 333 B1. Such a cutting machine comprises a working surface designed to receive at least one object, and a working group movably arranged above the working surface and comprising a knife or other cutting device for cutting objects located on the working surface. The term "cutting" does not necessarily mean a complete severing, so that a cutting process can also include a perforating or folding of the object or a similar work step, which can be carried out with a generic machine.

To prevent accidents, cutting machines are equipped with protective mechanisms to guarantee safe operation. Protective mechanisms are particularly necessary for cutting machines with speeds of over one meter per second and accelerations of over 10 m/s$^2$, as well as for cutting machines with a high material passage of over 65 mm. For example, in the prior art, light curtains are positioned close to a cutting machine, which also increases the space required by the cutting machine. In the event that the light curtain is interrupted—for example by a person coming too close to the cutting machine in operation—the operation of the cutting machine is interrupted. Likewise, laser scanners or ultrasonic sensors are used as a protective mechanism in the prior art. Both light curtains positioned in the vicinity of the cutting machine and laser scanners or ultrasonic sensors have the disadvantage that interruptions of the cutting process occur frequently–e.g. due to ignorance or non-observance of these protective mechanisms by people.

The object thus arises to provide a cutting machine with an improved protective mechanism.

SUMMARY OF THE INVENTION

The present invention relates to a cutting machine, comprising 1) a table with a flat working surface, which lies in a working surface plane, the working surface being designed to receive an object to be cut, 2) a light curtain device and a protective pane, wherein the light curtain device is designed to produce a light curtain, 3) a crossbeam, arranged above the working surface, mounted on the table and designed for linear positionability parallel to a first horizontal axis, 4) a module, in particular for receiving tools, mounted on the crossbeam and designed for linear positionability parallel to a second horizontal axis, wherein the second horizontal axis extends at right angles to the first horizontal axis, and 5) a control unit designed for controlling the cutting machine. The cutting machine according to the invention has two operating states, wherein in a first operating state the protective pane on one side of the table is below the plane of the working surface, and wherein in a second operating state both the protective pane and the light curtain, which can be generated by the light curtain device, on the side of the table are at least partially above the plane of the working surface, wherein in the second operating state the light curtain is at least partially above the protective pane.

The combined protective mechanism of protective pane and light curtain present in the second operating state also offers the advantage that parts which become detached during the cutting process are at least partially prevented from leaving the cutting machine. A transparent protective pane also allows the cutting process to be visually inspected, for example by a person or by a camera positioned outside the cutting machine.

Since the light curtain is at least partially above the protective pane in the second operating state, the light curtain can be positioned closer to the cutting machine—compared to the prior art—since, for example, the time required for a person to reach a danger zone of the cutting machine after passing through the light curtain is greater in the case of the cutting machine according to the invention in the second operating state than the time required in the case of a light curtain positioned according to the prior art. The light curtain, which is positioned higher than the prior art, is also less likely to be unintentionally interrupted by a user, which means that unintentional interruptions of the cutting process are less frequent.

Since parts that may become detached during the cutting process are also frequently retained by the protective pane, the light curtain can be positioned closer to the cutting machine—compared to the prior art—since the protective pane retains any parts that may become detached, preventing them from interrupting the light curtain. Detaching parts leave the cutting machine predominantly at the height of the protective pane. A higher mounted light curtain is therefore usually not frequently interrupted by detaching parts. The protective pane can also contribute to a reduction of the noise level outside the cutting machine caused by the cutting machine. The cutting machine according to the invention therefore has a more compact protective mechanism compared to the prior art, which furthermore leads to less frequent interruptions of the cutting process.

In one embodiment of the cutting machine, in the first operating state, the light curtain that can be generated by the light curtain device is located on the side of the table at least partially above the plane of the working surface.

In the first operating state, it is possible to check, for example, whether obstacles stand in the way of transferring the cutting machine to the second operating state. This enables a safe change from the first operating state to the second operating state. In the second operating state, there is a combined protective mechanism consisting of a protective pane and light curtain.

In one embodiment of the cutting machine, in the first operating state the light curtain extends substantially seamlessly up to the plane of the working surface, and in the second operating state the light curtain extends substantially seamlessly up to the protective pane, wherein the protective pane and the light curtain comprise a protective pane extension and a light curtain extension, respectively, in a direction orthogonal to the plane of the working surface, wherein the protective pane extension is greater, in particular twice as great, as the light curtain extension.

A seamless transition from the light curtain to the working surface in the first operating state or from the light curtain to the protective pane improves the protective mechanism, since unmonitored areas that can be easily traversed by a human, for example, are hereby reduced. A large protective pane extension compared to the light curtain extension is advantageous, since interruptions of the cutting process are less frequent as the protective pane physically prevents e.g. a user from entering a hazardous area of the cutting machine.

In another embodiment of the cutting machine, the light curtain device has two light curtain columns.

In another embodiment of the cutting machine, the cutting machine comprises a side cover attached to the side of the table and surrounding a side volume, wherein the protective pane is in the side volume in the first operating state.

In a further embodiment of the cutting machine, the cutting machine has a traversing module, which is designed in particular as a linear motor or as a pneumatic motor and is fitted in particular in the side volume, wherein the traversing module is set up to traverse the light curtain device and the protective pane, and wherein the control unit is designed to set the cutting machine in one of the two operating states by controlling the traversing module.

In a further embodiment of the cutting machine, the cutting machine has a loading state in which both the protective pane and the light curtain device are below the working surface level, in particular in the side volume. In this embodiment, the control unit is designed to set the cutting machine to the loading state by controlling the traversing module.

The side cover can thus prevent damage to the protective pane and the light curtain device, e.g. the two light curtain columns, during loading of the cutting machine with an object to be cut.

In the loading state, in which the cutting machine can be loaded, there are no elevations or obstacles in the way of the user. In the loading state, the cutting machine can therefore easily pick up an object to be cut. The cutting machine can change from the loading state first to the first operating state and then to the second operating state.

In another embodiment of the cutting machine, the control unit controls the traversing module so that the light curtain device and the protective pane are simultaneously traversed to one of the two operating states or to the loading state.

In another embodiment of the cutting machine, the protective pane and the light curtain device are not fixedly connected, and simultaneous movement is achieved with a transmission.

In another embodiment of the cutting machine, the control unit controls the traversing module so that the light curtain device and the protective pane are independently traversed to one of two operating states or to the loading state.

In another embodiment, the cutting machine comprises a frame and first and second pneumatic motors, wherein the light curtain device and the protective pane are connected to the frame, and wherein the first pneumatic motor is adapted to move the frame, wherein movement of the frame by the first pneumatic motor causes the light curtain device and the protective pane to move together, and wherein the second pneumatic motor is arranged to move the light curtain device relative to the frame, wherein the first pneumatic motor has a first possible displacement path and the second pneumatic motor has a second possible displacement path, and wherein the second possible displacement path is in particular shorter than the first possible displacement path. In this embodiment, the control unit is arranged to control the first and second pneumatic motors.

The second pneumatic motor moves the light curtain device relative to the frame and thus relative to the protective pane. In this embodiment, the second pneumatic motor is therefore set up to move only the light curtain device. The first pneumatic motor in turn moves the frame and thus, since it is connected to the frame, the light curtain device and the protective pane. In particular, the first pneumatic motor can thus move the light curtain device and the protective pane simultaneously and at the same speed. In particular, the second pneumatic motor has a shorter possible adjustment path than the first pneumatic motor, i.e. the first pneumatic motor can move the frame over a greater distance than the second pneumatic motor can move the light curtain device.

In this embodiment, the control unit is set up to set the cutting machine to the first or second operating state or to the loading state by controlling the first and second pneumatic motors. For setting the cutting machine into the loading state, the control unit controls in particular the first pneumatic motor, wherein the frame is moved below the working surface level. By controlling the second pneumatic motor, the cutting machine can be moved from the loading state to the first operating state. By controlling the first and second pneumatic motors by the control unit, the cutting machine can be set to the second operating state.

In a further embodiment of the cutting machine, a locking pawl ensures the cutting machine remaining in the second operating state, and functional sensor technology, in particular a Hall sensor and/or a light barrier and/or a position counter mounted in the traversing module, monitors a status regarding the cutting machine remaining in the second operating state.

A light barrier can be used, for example, to check whether the light curtain columns are fully extended. A device generating the light barrier can be mounted on or in the side cover, for example.

In a further embodiment of the cutting machine, the traversing module is adapted to detect the presence of forces in excess of gravity acting on the protective pane, and the traversing module is adapted to interrupt the traversing of the protective pane and/or the light curtain device in the event that the forces in excess of gravity exceed a predetermined force threshold.

In another embodiment of the cutting machine, the traversing module is arranged to traverse the protective pane through a longitudinal slot in the side cover, and the longitudinal slot is closed with cover brushes and/or rubber lips. Furthermore, the light curtain device can also be traversed through the longitudinal slot.

In a further embodiment of the cutting machine, the cutting machine comprises a plurality of protective panes and of traversing modules, wherein the protective panes are arranged in a protective pane plane and are held in the protective pane plane by guides during traverse by the traversing modules.

In another embodiment of the cutting machine, the control unit controls the plurality of traversing modules so that the plurality of protective panes are traversed simultaneously. Alternatively, the plurality of protective panes can also be moved independently of each other.

In a further embodiment of the cutting machine, a further side cover is attached to a further side of the table, in particular opposite the side of the table, which surrounds a further side volume, wherein at least one further protective pane, at least one further traversing module and two further light curtain columns correspond to the further side cover, wherein the at least one further protective pane and the at least one further traversing module and the two further light curtain columns are controlled by the control unit.

Alternatively, protective panes can be attached to three or all four sides of the table. Alternatively, protective panes and/or light curtain columns mounted on two sides of the table can also be moved by a traversing module.

BRIEF DESCRIPTION OF THE DRAWINGS

Further advantages of the present invention are apparent from the detailed description and drawings.

DETAILED DESCRIPTION OF THE DRAWINGS

Figure 1:
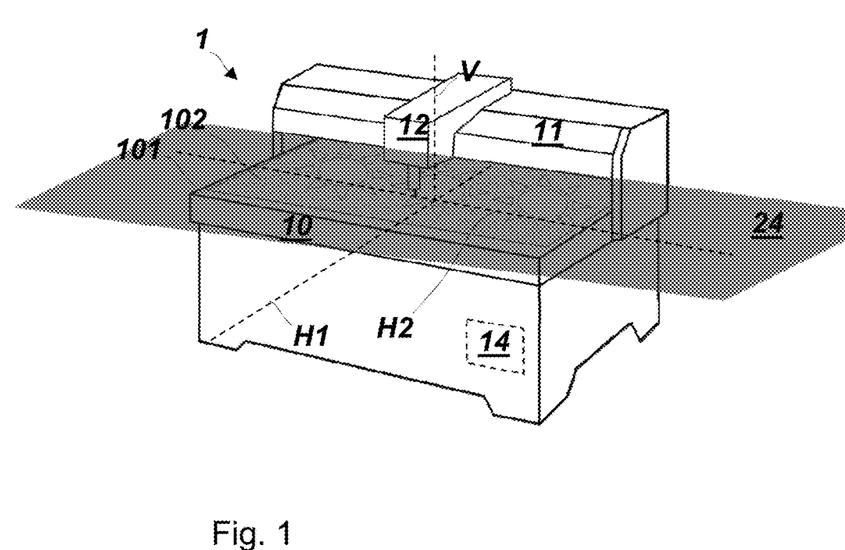
FIG. 1 shows a schematic representation of a cutting machine according to the prior art.

FIG. 1 shows a schematic representation of a cutting machine 1' according to the prior art, comprising a table 10' having a working surface 101', which lies in a working surface plane 24'. The working surface is designed to receive an object 102' to be cut, in the example shown a cardboard panel with patterns to be cut out. The cutting machine 1' has a crossbeam 11', which is arranged above the working surface and is mounted on the table in such a way that it is designed for linear positionability parallel to a first horizontal axis H1. A module 12' mounted on the crossbeam 11' is configured for linear positionability parallel to a second horizontal axis H2, wherein the second horizontal axis H2 is perpendicular to the first horizontal axis H1. The cutting machine also has a control unit 14', which is designed to control the cutting machine 1'. A vertical axis V may be defined as perpendicular to the working surface plane 24', the first horizontal axis H1, and the second horizontal axis H2.

Figure 2:
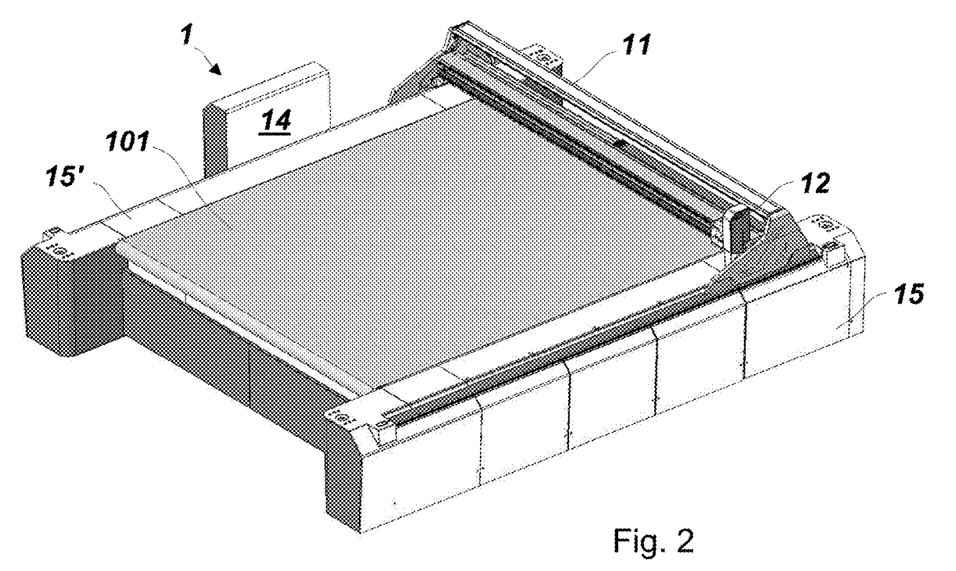
FIG. 2 shows a cutting machine according to one embodiment of the present invention in a loading condition.

FIG. 2 shows an embodiment of a cutting machine 1 in a loaded state. Similar to the example shown in FIG. 1, the cutting machine 1 has a crossbeam 11, which is arranged above the working surface 101 and is mounted on the table 10 in such a way that it is designed for linear positionability parallel to a first horizontal axis (e.g., similar to the axis H1). A module 12 mounted on the crossbeam 11 is configured for linear positionability parallel to a second horizontal axis (e.g., similar to the axis H2) perpendicular to the first horizontal axis. The module 12 is for receiving tools and is also referred to as a tool receiver. The cutting machine also has a control unit 14, which is designed to control the cutting machine 1.

As shown in FIG. 2, the cutting machine 1 has a working surface 101. The cutting machine 1 has two side covers 15, 15', which are attached to opposite sides of the cutting machine 1. Protective panes and light curtain columns (not shown in FIG. 2) are located in the side volume surrounded by the two side covers 15, 15'. Protective panes and light curtain columns are located below the working surface plane in which the working surface 101 is located. An object to be cut can easily be placed on the working surface 101 in the loaded condition.

Figure 3:
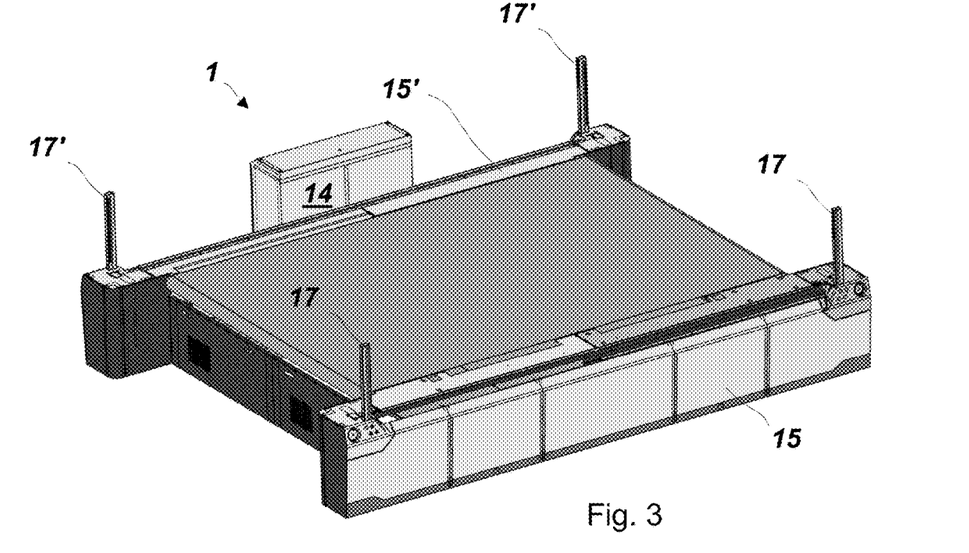
FIG. 3 shows a cutting machine according to one embodiment of the present invention in a first operating state.

FIG. 3 shows an embodiment corresponding to FIG. 2, wherein a cutting machine 1 is shown in a first operating state. In contrast to FIG. 2, four light curtain columns 17, 17' are extended from the side volumes surrounded by the side covers 15, 15', wherein two light curtain columns project from each side volume, i.e. two light curtain columns 17 on one side of the cutting machine 1, and two light curtain columns 17' on another side of the cutting machine 1. The four light curtain columns 17, 17' are located at least partially above a working surface plane along which the working surface 101 lies.

Figure 4:
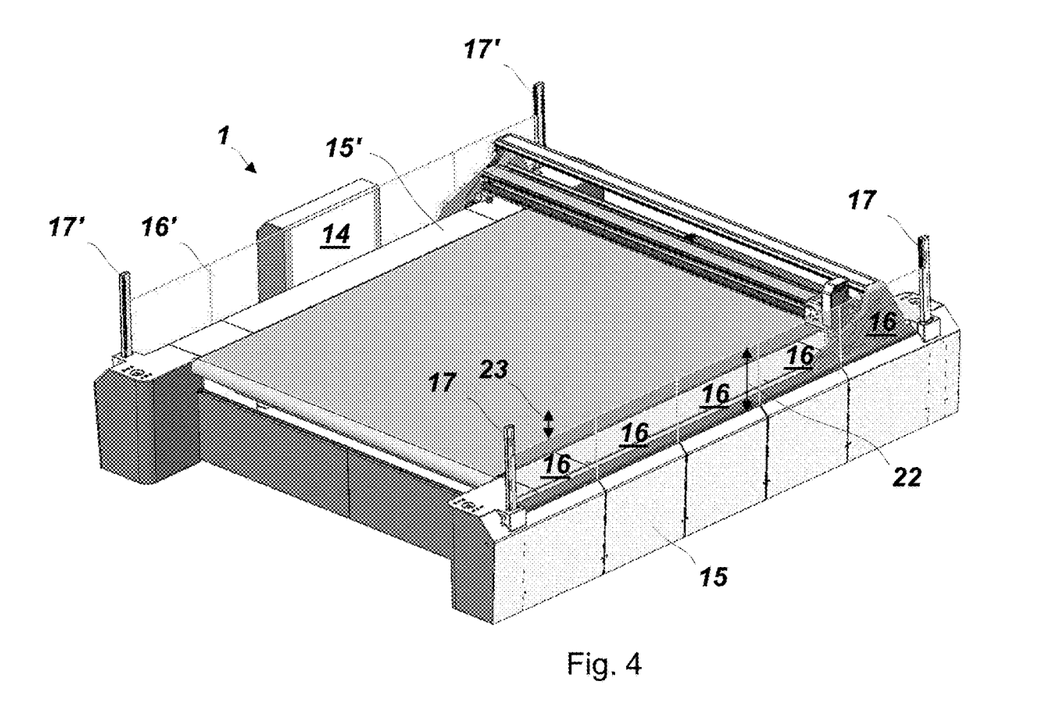
FIG. 4 shows a cutting machine according to one embodiment of the present invention in a second operating state.

Two adjacent pairs of light curtain columns 17, 17' each can be used to create light curtains. For example, the two light curtain columns 17 arranged on one side of the cutting machine 1 can be used to form a light curtain which extends between the two light curtain columns 17. The light curtain may extend seamlessly to the working surface in the first operating state, or it may be spaced from the working surface. Two light curtain columns located on opposite sides of the cutting machine 1 can also be used to form a light curtain extending between them. For example, lasers and reflectors mounted in or on the light curtain columns 17 can be used to form the light curtain. Should the light curtain be cut—for example by a human being—an operation of the cutting machine 1 can be interrupted. A light curtain thus serves as a protective mechanism, FIG. 4 shows an embodiment corresponding to FIG. 2, wherein a cutting machine 1 is shown in a second operating state. In contrast to FIG. 2, four light curtain columns 17, 17' and protective panes 16, 16' are extended from the side volumes surrounded by the side covers 15, 15', with two light curtain columns projecting from each side volume, i.e. two light curtain columns 17 on one side of the cutting machine 1, and two light curtain columns 17' on another side of the cutting machine 1. The four light curtain columns 17, 17' as well as the protective panes 16, 16' are located at least partially above the working surface plane 24.

Two adjacent pairs of light curtain columns 17, 17' each can be used to create light curtains. For example, the two light curtain columns 17 arranged on one side of the cutting machine 1 can be used to form a light curtain that extends between the two light curtain columns 17. Also, two light curtain columns located on opposite sides of the cutting machine 1 can be used to form a light curtain extending between them. For example, lasers and reflectors mounted in or on the light curtain columns 17 can be used to form the light curtain. Should the light curtain be cut—for example by a human being—an operation of the cutting machine 1 can be interrupted. A light curtain thus serves as a protective mechanism.

In the second operating state of the cutting machine 1 shown in FIG. 4, protective panes 16, 16' are also extended from the side volume. The extended protective panes 16, 16' serve as a further protective mechanism and prevent a human from reaching the area above the working surface during operation of the cutting machine 1. In this regard, the protection provided by protective panes 16, 16' can be achieved by a plurality of protective panes, wherein a plurality of protective panes 16, 16' can protrude from each of the two side volumes. The plurality of protective panes projecting from a side volume may each lie in a protective pane plane. FIG. 4 shows, by way of example, five protective panes 16 on one side of the cutting machine 1, and also five protective panes 16' on another side. The light curtain that can be generated on one side of the cutting machine 1 can also lie in the protective pane plane corresponding to this side.

The protective panes 16, 16' and the light curtains generated by the light curtain columns 17, 17' have a protective pane extension 22 and a light curtain extension 23, respectively, in a direction orthogonal to the working surface plane 24. The protective pane extension 22 in FIG. 4 is larger than the light curtain extension 23.

Figure 5:
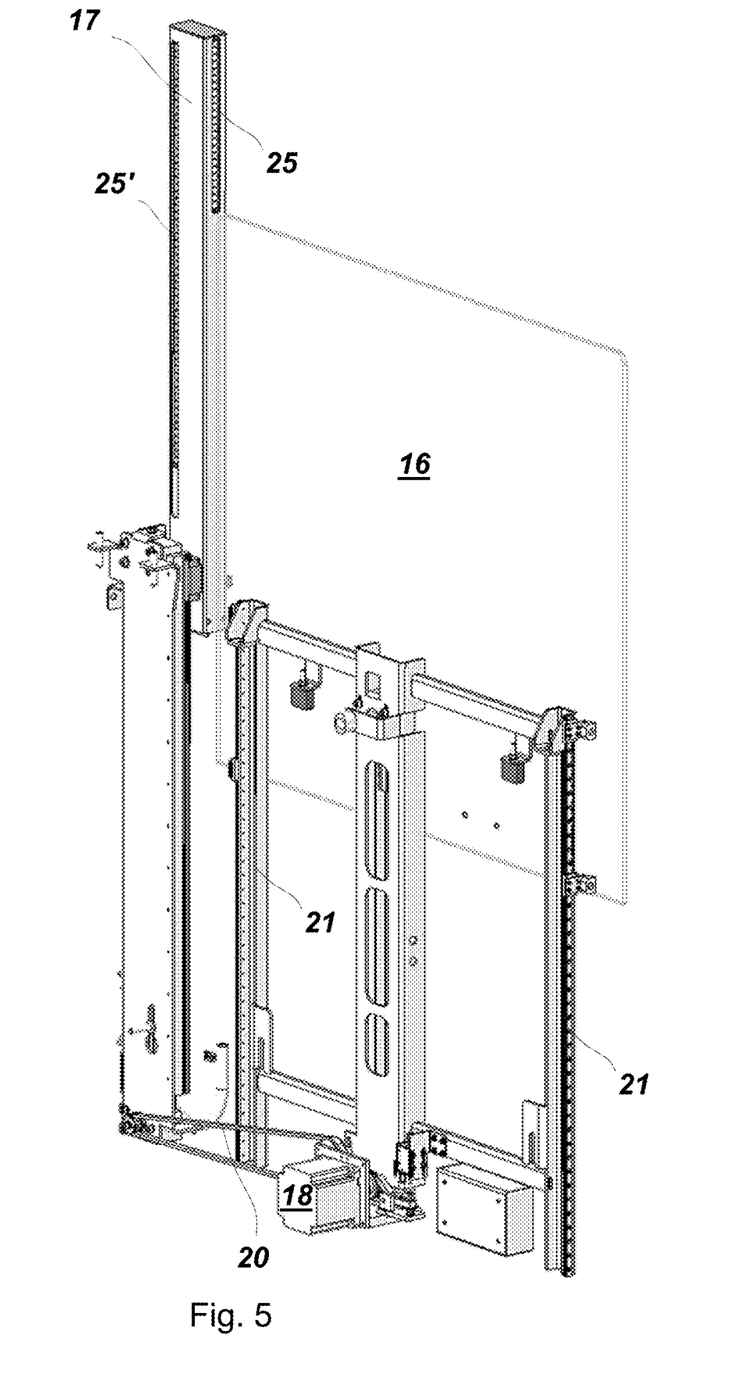
FIG. 5 shows a traversing module for traversing a light curtain column and a protective pane according to one embodiment of the present invention.

FIG. 5 shows a traversing module 18, which is designed for traversing a light curtain column 17 and a protective pane 16. The traversing module 18 is part of a lifting system for lifting the protective pane 16 and the light curtain column 17. The traversing module 18 can be designed, for example, as a linear motor. By means of guides 21, the protective pane 16 can be moved up and down in a stable manner by the traversing module 18. In some embodiments, a locking pawl may be used to ensure the cutting machine remaining in the second operating state. In some aspects, a Hall sensor, a light barrier, and/or a position counter 201 may be mounted in the traversing module to monitor a status regarding the cutting machine remaining in the second operating state. A transmission 20 enables simultaneous traversing of the light curtain column 17 and the protective pane 16, wherein the transmission 20 enables different traversing speeds. Alternatively, the protective pane and light curtain column can also be moved independently of each other (not shown in FIG. 5). The protective pane 16 is fixed by means of glued-on brackets. By compensating the length of the entire lifting system, lateral forces on the guides 21 can be minimized even under changing temperature conditions.

By varying travel speeds and using more than one drive, it is possible to switch between, for example, a loading state, a first operating state, and a second operating state. Starting from the loading state, in which both the light curtain column 17 and the protective pane 16 are below the working surface plane 24, different travel speeds can be used, for example, to move the light curtain column 17 out faster than the protective pane 16. In the first operating state, a protective mechanism is then not achieved by the protective pane 16, for example, but only by the light curtain column 17. The second operating state can be achieved by further traversing, wherein a combined protective mechanism is present in the second operating state, which is provided both by the protective pane 16 and by the light curtain column 17.

The light curtain column 17 and the protective pane 16 can also be moved independently of each other by means of a traversing module 18 (not shown in FIG. 5). Also, a traversing module 18 can be used only to traverse a protective pane 16 (also not shown in FIG. 5). The protective pane 16 and the light curtain column 17 can also be moved pneumatically (not shown in FIG. 5), wherein a pneumatic coupling can be used, for example, to achieve different travel speeds of the light curtain column 17 and the protective pane 16.

The light curtain column comprises a light device 25, 25' which cooperates in generating the light curtain. The light device 25, 25' may, for example, comprise lasers and/or reflectors. In the case of the light curtain column 17 shown in FIG. 5, the side of the light curtain column 17 facing toward the protective pane 16 has a first light device 25 which, in the second operating state, generates a light curtain that is located above the protective pane and extends seamlessly to the protective pane 16. On another side of the light curtain column 17 of FIG. 5 there is a second light device 25 which, in the second operating state, generates a light curtain which extends seamlessly, for example, as far as the working surface 101 of the cutting machine 1.

Figure 6:
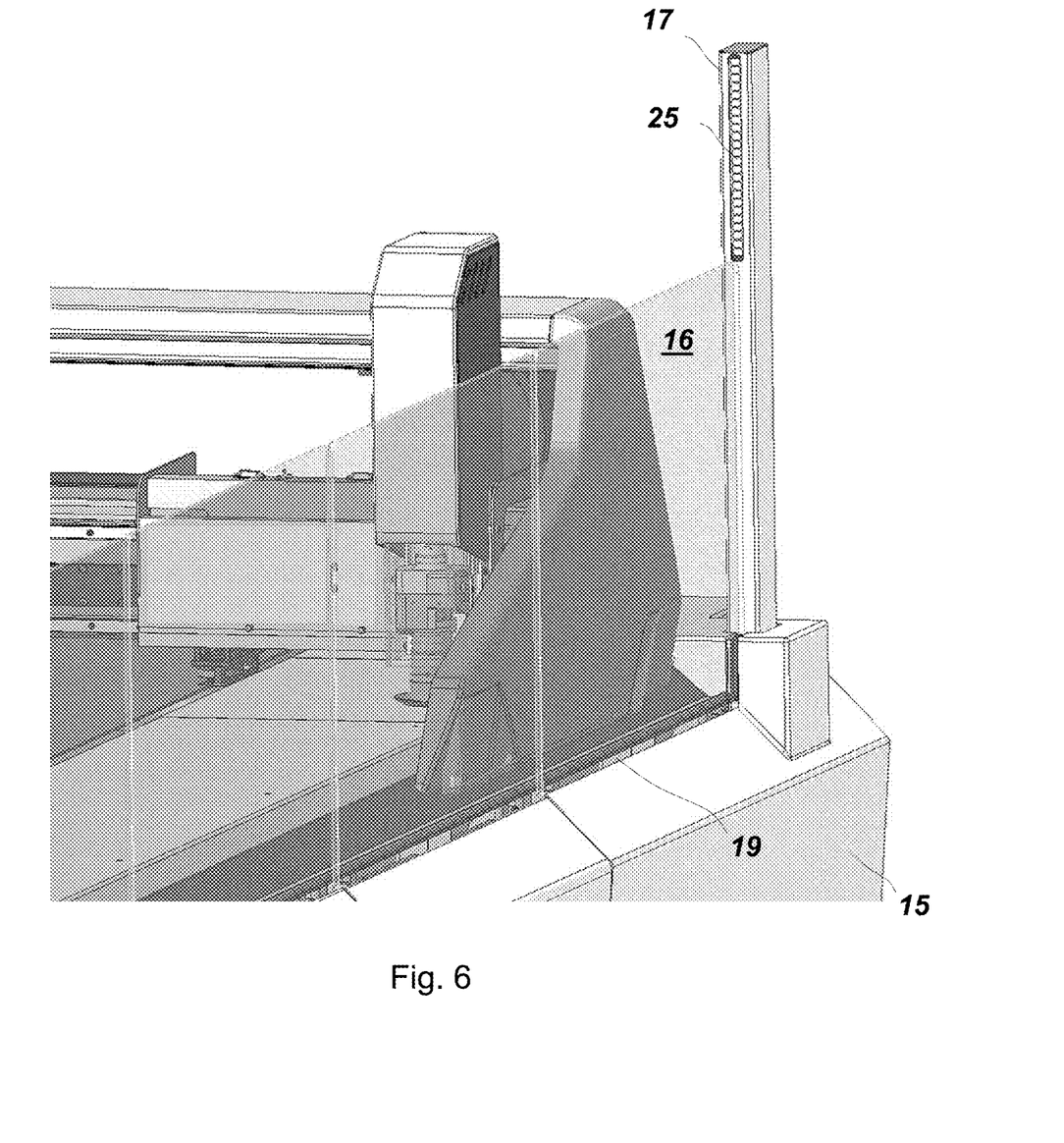
FIG. 6 shows a partial view of a cutting machine according to an embodiment of the present invention in a second operating state.

FIG. 6 shows a partial view of a cutting machine 1 in the second operating state. A side cover 15 is visible. Through a longitudinal slot 19 in the side cover 15, protective panes 16 can be moved in and out of the side volume surrounded by the side cover 15. The longitudinal slot 19 may be closed with cover brushes and/or rubber lips 200. The light device used to generate the light curtain is shown in FIG. 6. The light curtain that can be generated extends seamlessly to the protective panes 16 lying in a protective pane plane.

While the invention has been explained in terms of its preferred embodiment(s), many other changes and variations can be made without going beyond the scope of the present invention. Therefore, it is intended that the appended claims cover changes and variations contained in the actual scope of the invention.

The invention claimed is:

1. A cutting machine, comprising:
a table having a planar working surface lying in a working surface plane, the working surface being configured to receive an object to be cut;
a protective pane on a first side of the table;
a light curtain device on the first side of the table, including light sources, reflectors, or a combination thereof, and configured to generate a light curtain;
a crossbeam with a tool receiver disposed thereon, the crossbeam being arranged above the working surface and mounted above the table;
a control unit configured to control the cutting machine; and
a motor configured to traverse the light curtain device and the protective pane,
wherein the cutting machine has two operating states including a first operating state and a second operating state,
wherein, in the first operating state, the protective pane is below the working surface plane,
wherein, in the second operating state, both the protective pane and the light curtain are at least partially above the working surface plane, wherein in the second operating state the light curtain is at least partially above the protective pane, and
wherein the control unit is configured to set the cutting machine in one of the two operating states by controlling the motor.

2. The cutting machine according to claim 1, wherein in the first operating state the light curtain device is arranged to generate the light curtain on the first side of the table and at least partially above the working surface plane.

3. The cutting machine according to claim 1, wherein:
in the first operating state the light curtain device is arranged to generate the light curtain extending adjacent the working surface plane, and
in the second operating state the light curtain device is arranged to generate the light curtain extending adjacent the protective pane, the protective pane and the light curtain including, in a direction orthogonal to the working surface plane, a protective pane extension and a light curtain extension respectively, and the protective pane extension being greater than the light curtain extension.

4. The cutting machine according to claim 1, wherein the light curtain device comprises two light curtain columns that include the light sources, the reflectors, or the combination thereof.

5. The cutting machine according to claim 1, further comprising:
a first side cover attached to the first side of the table and surrounding a first side volume,
wherein the protective pane is in the first side volume in the first operating state.

6. The cutting machine according to claim 5,
wherein the motor is a linear motor
disposed in the first side volume.

7. The cutting machine according to claim 6,
wherein the cutting machine has a loading state in which both the protective pane and the light curtain device are below the working surface plane in the first side volume, and
wherein the control unit is configured to set the cutting machine in the loading state by controlling the motor.

8. The cutting machine according to claim 7, wherein the control unit is configured to control the motor so that the light curtain device and the protective pane are simultaneously traversed to one of the two operating states or to the loading state.

9. The cutting machine according to claim 6, further comprising:
a second side cover attached to a second side of the table opposite to the first side of the table, wherein the second side cover surrounds a second side volume;
at least one further protective pane on the second side of the table;
at least one further light curtain device including additional light sources, additional reflectors, or a combination thereof, the at least one further light curtain device on the second side of the table; and
at least one further motor configured to traverse the at least one further light curtain device and the at least one further protective pane,
wherein, in the first operating state, the at least one further protective pane is below the working surface plane,
wherein, in the second operating state, both the at least one further protective pane and the at least one further light curtain are at least partially above the working surface plane,
wherein the at least one further protective pane is in the second side volume in the first operating state, and
wherein the control unit is configured to set the cutting machine in one of the two operating states by controlling the motor and the at least one further motor.

10. The cutting machine according to claim 1, further comprising:
a frame,
wherein:
the light curtain device and the protective pane are connected to the frame,
the motor is arranged to move the frame, wherein movement of the frame by the motor causes a joint movement of the light curtain device and the protective pane, and
the control unit is configured to control the motor.

11. The cutting machine according to claim 1, further comprising:
one or more other protective panes; and
one or more other motors,
wherein the protective pane and the one or more other protective panes are arranged in a protective pane plane and are held in the protective pane plane by guides during traversing by the motor and the one or more other motors, respectively, and
wherein the control unit is configured to control the motor and the one or more other motors such that the protective pane and the one or more other protective panes are traversed simultaneously.

* * * * *